United States Patent [19]

Sabroff

[11] Patent Number: 5,119,013
[45] Date of Patent: Jun. 2, 1992

[54] SWITCHING REGULATOR WITH MULTIPLE ISOLATED OUTPUTS

[75] Inventor: Richard R. Sabroff, Lake Mills, Wis.
[73] Assignee: Square D Company, Palatine, Ill.
[21] Appl. No.: 686,551
[22] Filed: Apr. 17, 1991
[51] Int. Cl.⁵ .................................. G05F 1/577
[52] U.S. Cl. ............................ 323/267; 323/282
[58] Field of Search ............... 313/267, 282–290, 313/351

[56] References Cited

U.S. PATENT DOCUMENTS

| | | | |
|---|---|---|---|
| 3,328,674 | 6/1967 | Bleicher | 323/287 |
| 3,671,853 | 6/1972 | Weischedel et al. | 323/267 |
| 3,745,443 | 7/1973 | Weil | 323/267 |
| 3,790,878 | 2/1974 | Brokaw | 323/285 |
| 4,622,511 | 11/1986 | Moore | 323/282 |

*Primary Examiner*—Jeffrey Sterrett
*Attorney, Agent, or Firm*—Michael J. Femal

[57] ABSTRACT

A switching regulator power supply has multiple regulated and isolated voltage outputs. This is accomplished without the use of separate voltage regulators for each output voltage or extra transformer windings in the input circuitry of the power supply. Instead of an inductor, the primary winding of a transformer is used as the inductive component required in switching type regulators and is connected in series with the first output voltage. The secondary winding provides an isolated second output voltage. The primary to secondary turns ratio of the transformer determines the magnitude of the voltage.

8 Claims, 5 Drawing Sheets

SWITCHING REGULATOR WITH MULTIPLE ISOLATED OUTPUTS

TECHNICAL FIELD

Applicants' invention relates generally to electrical control mechanisms and more particularly to a power supply module contained on a circuit board assembly for supplying control voltages for a programmable logic controller that performs a number of control functions.

BACKGROUND ART

Power supply module assemblies providing a plurality of control voltages are well known. In many instances, these power supply assemblies are electrically connected in a rack assembly to a programmable logic controller (PLC) that is normally used to control of functions in a manufacturing operation. This programmable logic controller is often of necessity located on the plant floor and thus is subject to considerable abuse.

With the advent of smaller PLCs that are often mounted directly on the controlled device or machine, it becomes increasingly important to have power supply module that is compact in size and still be able to provide several regulated output voltages. Switching voltage regulators have been developed that can generally provide a single output with a variety of protective features and yet require a minimum of external and internal components to meet the size restrictions. Such a regulator is disclosed in the 1989 edition of National Semiconducter's "General Purpose Linear Devices Databook" page 2-51. However, if an additional and isolated output voltage is required, a separate regulator or duplicate circuit must be used for each voltage and a large transformer with multiple secondary windings may also be required. This results in increased size that may not be available on the device that is to be controlled. The present invention eliminates a majority of these extra components without loss of performance and has the potential for multiple output voltages with little additional circuitry.

SUMMARY OF THE INVENTION

Accordingly, the principal object of the present invention is to provide a simple, switching type voltage regulator with multiple, isolated voltage outputs. Switching regulators all require a switching device, a clamp diode, an LC filter, and a logic or control block. The apparatus of the present invention is based on these elements with the use of an additional transformer in the output section of a standard switching regulator circuit.

The primary of the transformer is in series with the main voltage output. The secondary or multiple secondaries of the transformer are used to provide the separate and isolated voltage outputs. The resultant power supply can provide multiple voltage outputs of different magnitudes and polarities and is adaptable to provide the levels commonly used in programmable logic controllers (PLCs).

DETAILED DESCRIPTION

Although this invention is susceptible to embodiments of many different forms, a preferred embodiment will be described and illustrated in detail herein. The present disclosure exemplifies the principles of the invention and is not to be considered a limit to the broader aspects of the invention to the particular embodiment as described.

Figure 1:
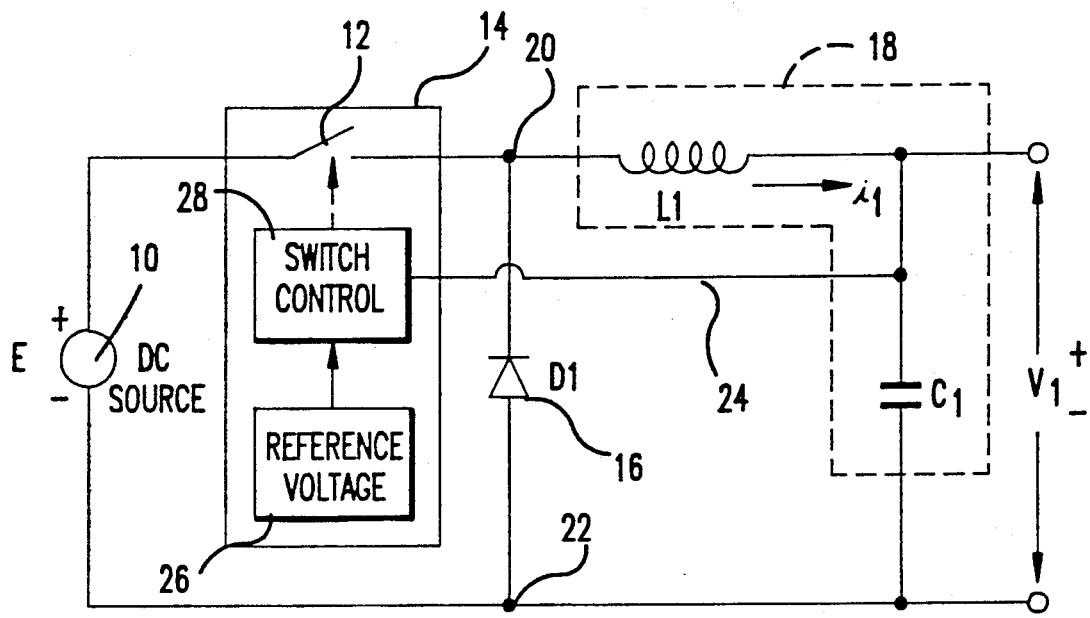
FIG. 1 is schematic block diagram of a switching regulator power supply representing prior art.

Referring to FIG. 1 of the drawings, a typical switching voltage regulator representing prior art is presented. It contains the essential elements of a DC voltage source 10, a switching device 12, a logic control block 14, a clamp diode 16, and an LC filter 18 consisting of L1 and C1. There is no isolation between the line voltage E and the output voltage V1, however it is common practice to have at least one common line between input and output to reduce ground loops.

High efficiency is achieved by this type of voltage regulation. A general theory of operation follows. The switch 12 is usually a power transistor operating in a switching mode. When the switch 12 is closed, full input voltage E is applied to the input 20 of the LC filter 18 and 0 volts is applied at input 20 when the switch 12 is open. Assuming that the switch 12 is operating at a 50% duty cycle (D) the output voltage V1 will be one half the input voltage E. Other duty cycles will result in the relationship of $V1 = DE$. A regulated output can be obtained therefore by varying the duty cycle.

A more specific description will now be detailed. With the switch 12 closed, current I1 flows through the inductor L1 from the input E to the load. The voltage across the inductor L1 becomes the difference between the input E and the output V1 ($VL = E\ V1$). During this time, the current I1 will increase. When the switch 12 opens, energy stored in the inductor L1 will continue to flow to the load and return through line 22 and the clamp diode 16 (D1) to input 20. The inductor L1 voltage becomes reversed and essentially equal to $-V1$ and the current I1 decreases. The average current through the inductor L1 will equal the load current. Capacitor C1 will maintain V1 constant, thereby keeping the load current constant. When the inductor current I1 exceeds the load current, the capacitor C1 will charge. When the inductor current I1 is less than the load current, capacitor C1 will discharge. The logic and switch control block 14 contains the decision making elements necessary to maintain regulation by controlling the duty cycle of the switch 12. A feedback signal 24 is compared with a reference voltage 26 in the switch control section 28. If the output voltage V1 is too high, the duty cycle D will be lowered and if V1 is too low, D will increase.

Figure 2:
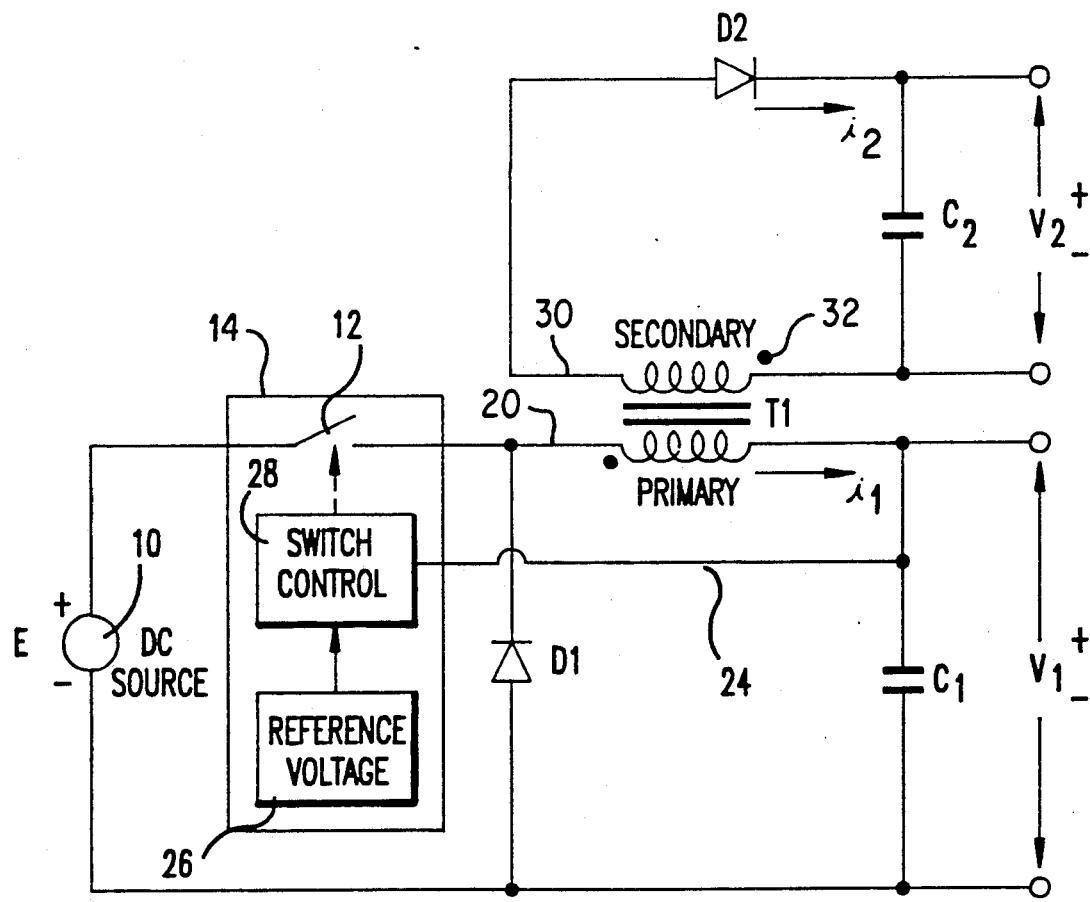
FIG. 2 is a schematic block diagram of a switching regulator power supply constructed in accordance with the teachings of the present invention.

According to one aspect of the invention, the switching regulator power supply is configured such as shown in FIG. 2. The primary circuit is the same as FIG. 1 with the exception of replacing inductor L1 with transformer T1 and adding the circuitry in T1's secondary. It is assumed that flux linkages of the transformer are unidirectional and greater than zero at all times.

With switch 12 closed, dotted end 20 of the primary winding of transformer T1 and dotted end 32 of T1's secondary winding are positive relative to the undotted ends of transformer T1. Diode D2 is reverse biased and current I2 is zero. Voltage across the primary of T1 is E-V1 and the current I1 increases as described previously. When switch 12 opens, the polarity of the voltage across the primary of T1 reverses. Diode D1 will conduct. The voltage across the secondary of T1 will be equal to the primary voltage, assuming a 1:1 turns ratio. Voltage drops across diodes D1 and D2 are equal, now neglecting losses in the transformer itself. The undotted end 32 of T1 will not become positive with respect to its dotted end 32 and current I2 will flow through diode D2. The magnitude of the voltage across either winding of the transformer will be the smaller of (V1+VD) or (V2+VD) where VD is the voltage drop across the diodes D1 or D2. If V1 is less than V2, the voltage drop across the transformer will be (V1+VD) and there will be no current in the secondary circuit. If V1 is greater than V2, the voltage drop across the transformer T1 will be (V2+VD) and there will be no current in the primary circuit.

A property of a transformer (inductor) is that the flux linkages can not change instantly. Flux linkages are determined by the number of ampere-turns in the windings. If transformer T1 has a 1:1 winding ratio, the total current in the two windings just after the switch 12 opens will be the same as it was just before opening. The available current will divide between the primary and secondary circuits based upon the variations of the components themselves. Even though the voltages across capacitors C1 and C2 may not be precisely equal, currents can exist in both the primary and secondary circuits at the same time. Capacitors C1 and C2 have different equivalent series resistances (ESR). The forward voltage drops of diodes D1 and D2 will also be different, as will the losses in the primary and secondary windings of transformer T1.

Regardless of these differences, the two voltages V1 and V2 will converge to being nearly equal. During the time interval that switch 12 is open, the lower voltage of the two will cause the capacitor associated with the higher voltage to discharge until V1 and V2 are equal. The primary circuit provides the means of regulation. Logic control block 14 contains the switch 12, the reference voltage 26 and the switch control logic 28. Output voltage V1 will be regulated to the reference voltage 26. It follows that output voltage V2 will be also regulated to the same reference voltage 26, assuming a 1:1 transformer ratio for T1. Regulation will depend, however, on component variations in each circuit.

Figure 3:
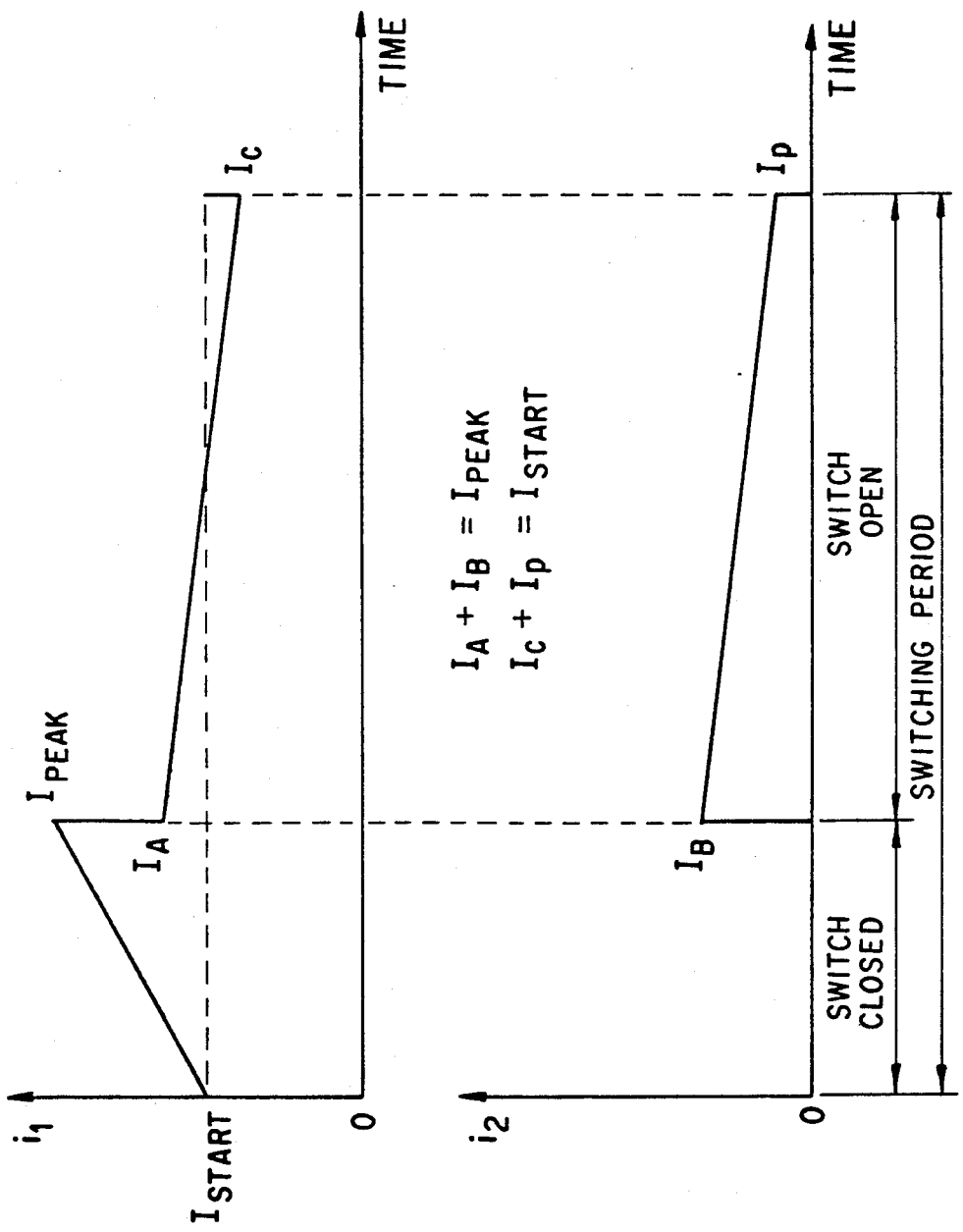
FIG. 3 is a graph of typical current waveforms detailing the current flow in the primary and secondary windings of the transformer.

Referring now to FIG. 3, current waveforms illustrating one switching period are shown. At time 0, switch 12 is closed. Current I1 increases from a level I-START to a point I-PEAK when switch 12 opens. Current I2 is zero during this time. At the instant when switch 12 opens, the current in transformer T1 is I-PEAK. This current divides in the primary and secondary circuits of transformer T1 as detailed above. I1 will equal IA and I2 will equal IB. I1 will decay to a level of IC and I2 will decay to a level ID during the time period when switch 12 is open. At the point where switch 12 will reclose, IC and ID summed will equal I-START and the cycle repeats. Although the current in one winding or the other could be zero when switch 12 is open, in reality, under steady state conditions, the circuit with no current would eventually control the transformer T1 voltage as the output voltage V1 or V2 decayed below the circuit with current flow. Therefore, current will exist in both primary and secondary circuits when switch 12 is open, with I1 and I2 balancing in a manner to insure that V1 will equal V2.

Figure 4A:
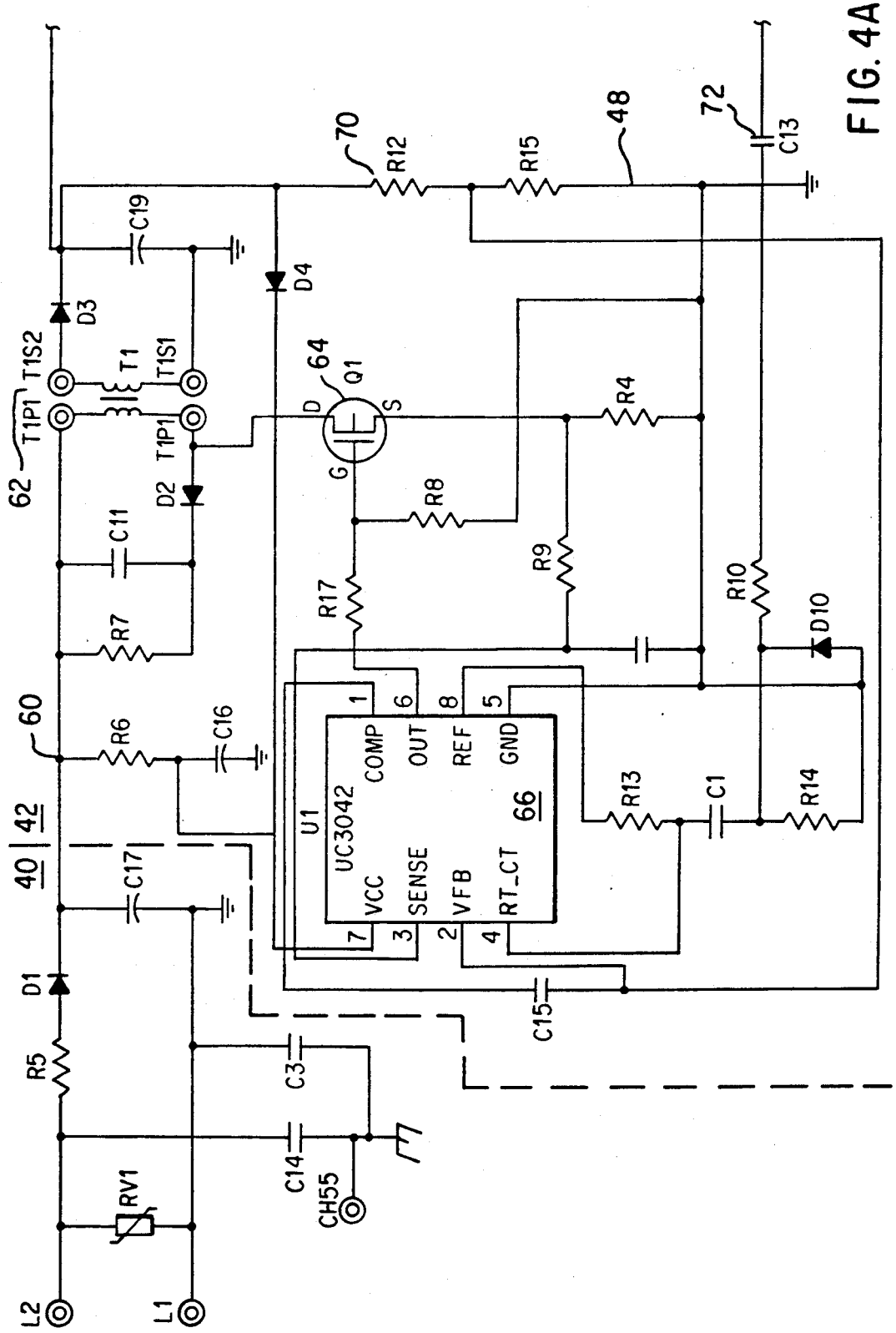
FIGS. 4A and 4B are detailed schematic diagram of a switching regulator power supply constructed in accordance with the teachings of the present invention.
Figure 4B:
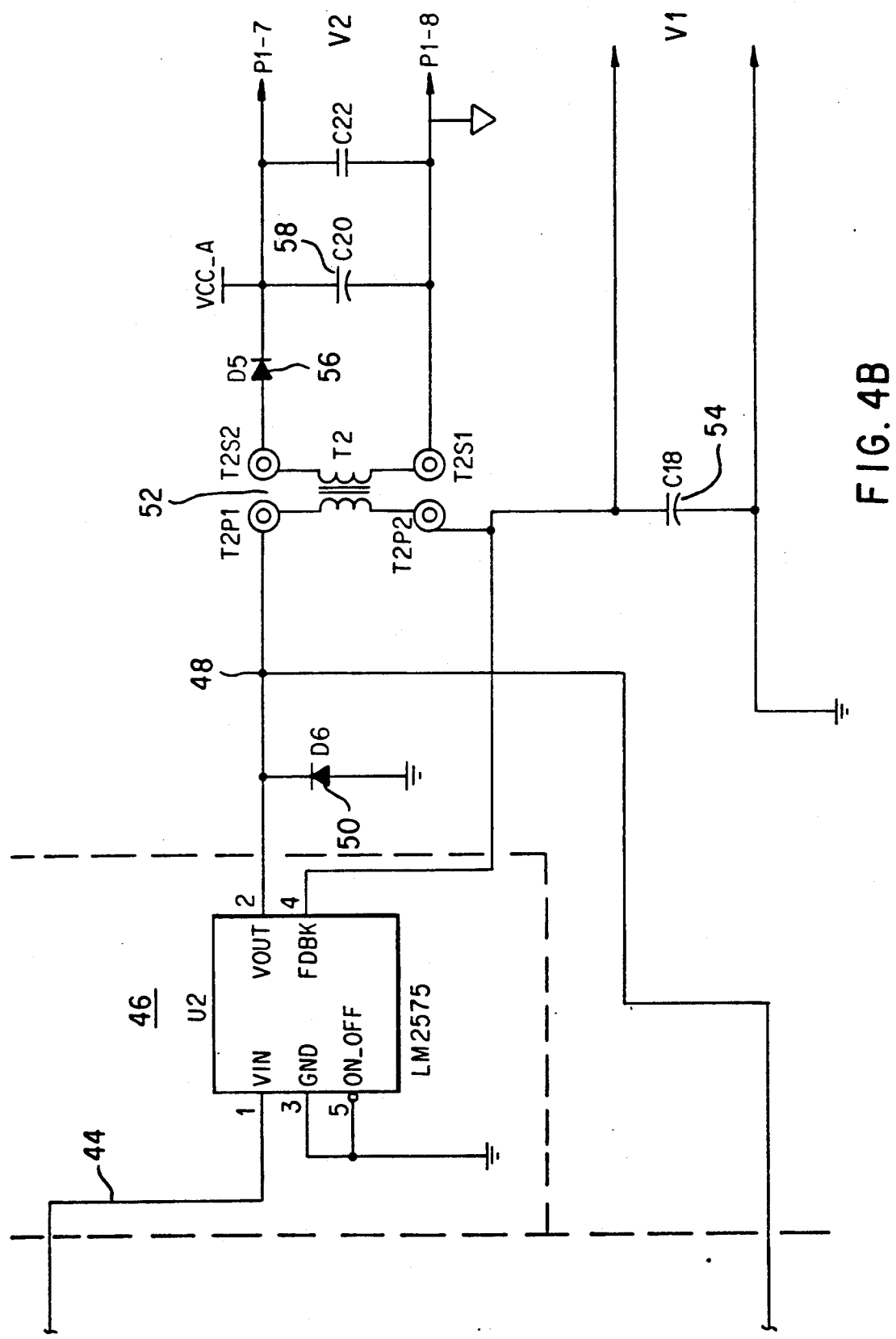

FIG. 4 details a preferred embodiment of the present invention. The dc source 10 of FIG. 2 has been replaced by a standard half-wave rectifier circuit 40 and a preregulator circuit 42. The DC output 44 of the preregulator circuit 42 is fed to a packaged switching type voltage 46 that internally combines the switch 12 and logic control block 14. The voltage regulator 46 is a National Semiconductor Type LM2575 but other similar types could be used. The output 48 of the regulator 46 is connected to diode 50 and the primary of transformer 52. Output V1 is across capacitor 54. Diode 50 performs the freewheeling function of D1 discussed above. The secondary of transformer 52 is connected to blocking diode 56 and the output V2 is across capacitor 58. Diode 56 and capacitor 58 are equivalent to diode D2 and capacitor C2 respectively.

Details of the rectifier circuit 40 and the preregulator circuit 42 are well known to those skilled in the art. Rectifier circuit 40 produces a high DC voltage at node 60. The primary of transformer 62 is switched on and off by transistor 64, which is controlled by a packaged current mode controller 66. The secondary of transformer 62 is rectified by diode 68. Output 44 of the preregulator 42, in addition to supplying the DC voltage to the regulator 46 is coupled back through resister 70 to the feedback terminal 2 of controller 66 to provide the regulation. The output 48 of regulator 46 is coupled back through capacitor 72 to provide a means of synchronization of the operating frequencies of the regulator 46 and the controller 66. This is of particular importance in many noise sensitive applications.

The principles of operation of the present invention can be extended to include output voltages V1 and V2 that are of different magnitudes. This can be accomplished by replacing the transformer T1 with a different transformer that has a secondary to primary turns ratio other than 1:1. With a 1:1 turns ratio, the primary and secondary winding voltage of transformer T1 will be equal. This implies the more generalized term that there are equal voltages per turn. Likewise, the concept of having no instantaneous change in the total current of the two windings can be thought of as having no instantaneous change in the total ampre-turns of the two windings. It follows that the isolated output voltage V2 will be equal to the non-isolated output V1 multiplied by the secondary to primary turns-ratio. Output voltage V2 can be either higher or lower than V1.

Figure 5:
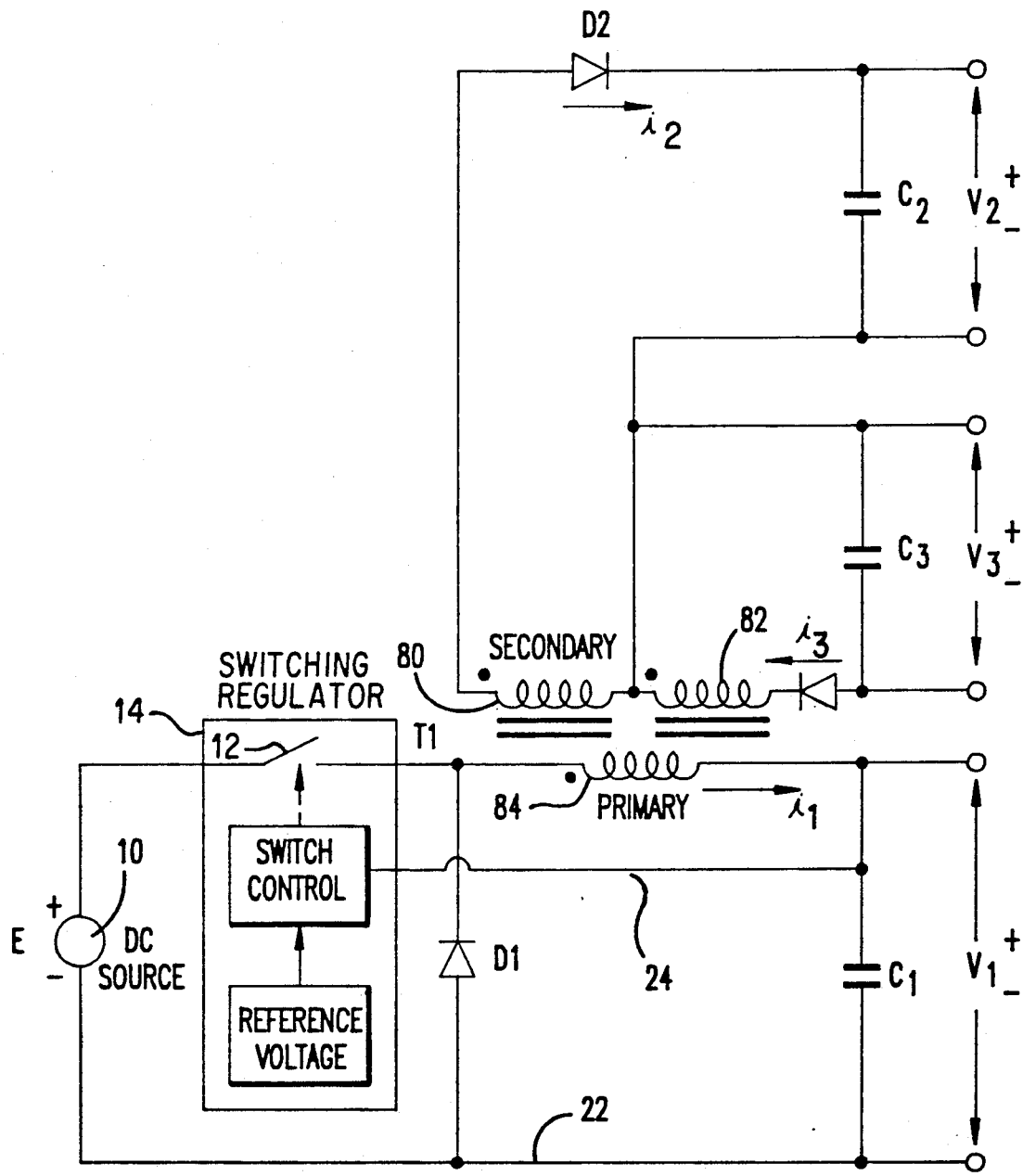
FIG. 5 is block diagram of a switching regulator power supply with multiple outputs constructed in accordance with the teachings of the present invention.

A further extension of the principles previously explained results in being able to provide more than one isolated output as illustrated in FIG. 5. Transformer T1 has been replaced with a transformer having dual secondary windings 80 and 82. The outputs V2 and V3 are directly proportional to the primary output V1, based on equal voltages per turn. If K1 is the turns ratio between the primary winding 84 and secondary winding 80 and K2 is the turns ratio between the primary winding 84 and secondary winding 82, the relationships become:

$$V2 = K1 \times V1$$

and $$I3 = K2 \times V1$$

The circuit will function as before in that the output with the lowest voltage will cause the other two outputs to converge to that same level and regulation will be maintained.

While the specific embodiments have been illustrated and described, numerous modifications are possible without departing from the scope or spirit of the invention.

We claim:

1. A switching regulator power supply for producing a plurality of output voltages, comprising:
   (a) a DC voltage source for producing an input voltage;
   (b) a transformer having a primary and a secondary winding;
   (c) a controllable electronic switch operating in an on-off switch mode connected between the positive terminal of said input voltage and a first side of said transformer primary;
   (d) a first capacitive means connected between a second side of said transformer primary and a negative terminal of said input voltage, said capacitive means for storing a first output voltage;
   (e) a logic control means for controlling said switch mode of said electronic switch, said control means based on a relationship between a reference voltage and a feedback signal from said first output voltage, said control means resulting in the first output voltage maintaining an essentially constant magnitude proportional to the reference voltage;
   (f) a first diode connected between the first side of said transformer primary winding and said negative terminal of said input voltage, said diode for providing a path of conduction for said first capacitive means when said control switch is open; and
   (g) a second diode and a second capacitive means connected in series with the secondary winding of said transformer, said second diode blocking conduction in the secondary winding when said control switch is closed and said capacitive means for storing a second output voltage, said second output voltage electronically isolated from but proportional to said first output voltage.

2. The switching regulator power supply of claim 1 wherein said transformer has a primary to secondary turns ratio of 1:1, resulting in said second voltage output equalling said first voltage output.

3. The switching regulator power supply of claim 1 wherein said transformer has a primary to secondary turn ratio other than one, resulting in said second output voltage equalling said first voltage times the turns ratio.

4. The switching regulator power supply of claim 1 wherein said DC voltage source is a separate AC to DC voltage converter, allowing said switching regulator power supply to be line operated.

5. The switching regulator power supply of claim 4 wherein a feedback signal from said first output voltage is used to synchronize the operating frequency of said AC to DC voltage converter to said control means to minimize generated electromagnetic noise interference.

6. A switching regulator power supply for producing a plurality of output voltages, comprising:
   (a) a DC voltage source for producing an input voltage;
   (b) a transformer having a primary and a plurality of secondary windings;
   (c) a controllable electronic switch operating in an on-off switch mode connected between the positive terminal of said input voltage and a first side of said transformer primary;
   (d) a first capacitive means connected between a second side of said transformer primary and a negative terminal of said input voltage, said capacitive means for storing a first output voltage;
   (e) a logic control means for controlling said switch mode of said electronic switch, said control means based on a relationship between a reference voltage and a feedback signal from said first output voltage, said control means resulting in the first output voltage maintaining an essentially constant magnitude proportional to the reference voltage;
   (f) a first diode connected between the first side of said transformer primary winding and said negative terminal of said input voltage, said diode for providing a path of conduction for said first capacitive means when said control switch is open; and
   (g) a separate diode and a separate capacitive means connected in series with each of the separate secondary windings of said transformer, said separate diode blocking conduction in each of the secondary windings when said control switch is closed, and said separate capacitive means for storing a separate output voltage for each of said secondary windings, said separate output voltages electronically isolated from but proportional to said first output voltage.

7. The switching regulator power supply of claim 6 wherein said transformer has a primary to secondary turns ratio of 1:1, resulting in said second voltage output equalling said first voltage output.

8. The switching regulator power supply of claim 6 wherein said transformer has a primary to secondary turns ratio other than one, resulting in said second output voltage equalling said first voltage times the turns ratio.

* * * * *